(12) United States Patent
Eyres et al.

(10) Patent No.: US 7,567,594 B2
(45) Date of Patent: Jul. 28, 2009

(54) STABILIZATION OF ACTIVELY Q-SWITCHED LASERS

(75) Inventors: Loren Eyres, Palo Alto, CA (US); Jeffrey Gregg, San Jose, CA (US); Werner H. Wiechmann, San Jose, CA (US); James J. Morehead, Mountain View, CA (US)

(73) Assignee: JDS Uniphase Corporation, Milpitas, CA (US)

( * ) Notice: Subject to any disclaimer, the term of this patent is extended or adjusted under 35 U.S.C. 154(b) by 1 day.

(21) Appl. No.: 11/277,733

(22) Filed: Mar. 28, 2006

(65) Prior Publication Data

US 2006/0222023 A1 Oct. 5, 2006

Related U.S. Application Data

(60) Provisional application No. 60/756,616, filed on Jan. 5, 2006, provisional application No. 60/666,646, filed on Mar. 29, 2005.

(51) Int. Cl.
*H01S 3/10* (2006.01)
*H01S 3/11* (2006.01)

(52) U.S. Cl. ............................. 372/25; 372/11; 372/12; 372/22; 372/21; 372/30

(58) Field of Classification Search ............. 372/10–17, 372/21–22, 23, 25, 29.02, 30
See application file for complete search history.

(56) References Cited

U.S. PATENT DOCUMENTS

| | | | | |
|---|---|---|---|---|
| 5,058,118 A | * | 10/1991 | Qui et al. | 372/21 |
| 5,394,260 A | * | 2/1995 | Suzuki et al. | 398/185 |
| 5,812,569 A | * | 9/1998 | Walker et al. | 372/30 |
| 6,418,154 B1 | * | 7/2002 | Kneip et al. | 372/25 |
| 6,654,391 B2 | * | 11/2003 | Adams | 372/10 |
| 6,931,035 B2 | * | 8/2005 | Wang | 372/10 |
| 7,130,318 B2 | * | 10/2006 | Wang et al. | 372/10 |

OTHER PUBLICATIONS

Young et al., "Q-Switched Laser With Controllable Pulse Length", Feb. 15, 1971, Applied Physics Letters, V 18 N 4, 129-130.*
Moon et al., "Effect of Q-switch Gate Time on the Temporal and Spatial Behavior of an Intracavity Frequency-Doubled Diode-Pumped Nd:YagLaser", Nov. 5, 2000, Journal of the Korean Physical Society, V 37 N 5, 739-743.*

(Continued)

*Primary Examiner*—Minsun Harvey
*Assistant Examiner*—Joshua King
(74) *Attorney, Agent, or Firm*—Allen, Dyer, Doppelt, Milbrath & Gilchrist, P.A.

(57) ABSTRACT

The invention discloses an actively Q-switched laser with an intracavity nonlinear coupler in which a stable optical frequency converted output is generated. A Gain Fluctuation Insensitivity Condition is defined and described for several examples. The nonlinear coupler with a coupling level which satisfies this Condition permits stable laser operation with minimal interaction between pulses, even when the pulses are clipped by the Q-switch. Thus, the output pulse duration and repetition frequency of the disclosed laser can be varied over a large range substantially independent of laser gain level and dynamics. Second and third harmonic optical frequency conversion is demonstrated, although the disclosed laser is applicable to other optical frequency conversion regimes as well.

21 Claims, 8 Drawing Sheets

OTHER PUBLICATIONS

Dekker et al., "2.27-W Q-switched Self-doubling Yb:YAB Laser with Controllable Pulse Length", Feb. 2005, Optical Socity of America, V 22 N 2, 378-384.*

J. E. Murray and S. E. Harris, "Pulse Lengthening via Overcoupled Internal Second-Harmonic Generation", *J. Appl. Phys.* 41, pp. 609-613, 1970.

J. F. Young, J. E. Murray, R. B. Miles, and S. E. Harris, "Q-switched Laser with Controllable Pulse Length", *Appl. Phys. Lett.* 18, pp. 129-130, 1971.

P. Dekker, J.M. Dawes, and J. A. Piper, "2.27-W Q-switched self-doubling Yb:YAB laser with controllable pulse length", *J. Opt. Soc. Am. B* 22, pp. 278-384, 2005.

HeeJong Moon, Jonghoon Yi, Youg-joo Rhee, Byungheon Cha and Jongmin Lee, "Effect of Q-switch Gate Time on the Temporal and Spatial Behavior of an Intracavity Frequency-Doubled Diode-Pumped Nd:YAG Laser", *J. Korean Physical Society*, 37, 2000, pp. 739-743.

* cited by examiner

STABILIZATION OF ACTIVELY Q-SWITCHED LASERS

CROSS REFERENCE TO A RELATED APPLICATION

The present invention claims priority from U.S. Patent Application No. 60/666,646 filed Mar. 29, 2005 and from U.S. Patent Application No. 60/756,616 filed Jan. 5, 2006, which are incorporated herein by reference for all purposes.

FIELD OF THE INVENTION

This invention relates to actively Q-switched pulsed lasers. In particular, actively Q-switched pulsed lasers are disclosed that have an intracavity nonlinear output coupler generating frequency converted optical output. More particularly, according to this invention the output the pulse duration and repetition frequency can be varied over a large range substantially independent of laser gain.

BACKGROUND OF THE INVENTION

High repetition-rate, diode-pumped, solid-state (DPSS) Q-switched lasers with near-diffraction-limited $TEM_{00}$ beams and high overall efficiency are used widely in scientific, security, sensing, and material processing applications. In all cases, it is desirable to have the laser output tailored to the application in terms of wavelength, pulse energy, pulse width, and repetition rate.

In materials processing, such important aspects as removal rates, kerf quality, and collateral damage can depend strongly on all of these variables. However, the degree of possible tailoring among these parameters is tightly constrained by well-understood underlying physics. The output pulse energy and repetition rate are limited by the pumping level and total extractable power available from the laser system, though techniques such as nonlinear frequency conversion can relatively efficiently transfer this power to other wavelengths.

The laser pulse width depends on the physical laser parameters (gain medium, cavity round trip time, etc.) and the initial inversion level, which determine the build-up time and the energy extraction dynamics, and so is typically strongly coupled to the pulse energy. This constraint becomes more problematic as one moves to higher pulse repetition frequency since the energy available per pulse is reduced, leading to longer build-up times, longer pulses, lower intensities, and ultimately lower efficiency in frequency conversion.

For many applications, however, it would be desirable to break this pulse energy-pulse width constraint, so that the pulse width could be selected independently of the pulse energy. If overall efficiency were also preserved, such a laser would be an extremely adaptable tool, making possible high-efficiency, frequency-converted lasers over a wide range of repetition rates and pulse widths.

This invention discloses a laser and method for operating it to achieve a stable output with variable pulse width and high efficiency over a wide range of repetition frequency.

Intra-cavity frequency converted lasers have the significant advantage of highly efficient conversion to other wavelengths, reduced peak and average intensities on nonlinear crystals, and reduced pulse-to-pulse noise levels compared to similar externally frequency converted lasers, but typically exhibit longer pulses than lasers with external frequency conversion.

This pulse lengthening is due to two effects: low linear losses and intensity clamping by the nonlinear coupling. Internally (intracavity) frequency-converted lasers typically have low linear losses to maximize frequency conversion efficiency. As the circulating intensity decays, the nonlinear losses decrease, so that the pulse decay stretches out. During this decay, energy is still extracted from the gain medium, but the instantaneous nonlinear efficiency is progressively falling, which reduces the overall conversion efficiency. The overall efficiency can be improved by increasing the nonlinear output coupling, but typically only at the cost of increasing the pulse width yet further, since the increased nonlinear coupling more effectively clamps the circulating intensity and energy extraction rate.

Lasers with controllable pulse width have been constructed using a variety of techniques. Among the earliest employed increased nonlinear optical (NLO) coupling to lengthen the pulse width as analyzed and demonstrated by Murray and Harris (J. E. Murray and S. E. Harris, "Pulse Lengthening via Overcoupled Internal Second-Harmonic Generation", *J. Appl. Phys.* 41, pp 609-613, 1970; J. F. Young, J. E. Murray, R. B. Miles, and S. E. Harris, "Q-switched Laser with Controllable Pulse Length", *Appl. Phys. Lett.* 18, pp. 129-130, 1971). They determined an optimal level of second harmonic coupling at which the maximum intensity at the harmonic frequency is achieved. For lower harmonic coupling levels, the pulse width is approximately constant. For harmonic coupling levels greater than the optimal level, the larger NLO coupling effectively clamps the circulating intensity and lengthens the pulse accordingly without a loss of efficiency. However, this technique can only produce pulse lengthening and offers only a relatively slow pulse adjustment mechanism since the nonlinear material temperature or angle must be tuned on a millisecond time scale.

Recent work has utilized self-doubling laser gain media to achieve similar effects (P. Dekker, J. M. Dawes, and J. A. Piper, "2.27-W Q-switched self-doubling Yb:YAB laser with controllable pulse length", *J. Opt. Soc. Am. B* 22, pp. 278-384, 2005).

The invention disclosed herewith introduces an improvement over an earlier patent on Q-switch clipping of pulse falling edges (Adams, U.S. Pat. No. 6,654,391). The main objective of the Adams patent is to close the Q-switch after the majority of the frequency converted pulse is over in order to retain in the gain medium some fraction of the energy which would otherwise have been extracted by the trailing edge of the fundamental wavelength pulse.

More stored energy and gain are therefore available for the following pulse, resulting in higher intensity fundamental pulses, higher conversion efficiencies, and more power at the converted wavelength. Slight pulse shortening may also be achievable, but as the Adams patent states, as the Q-switch window becomes shorter and begins to clip significantly into the trailing edge of the pulse, the pulse width becomes unstable.

This instability typically takes the form of a period multiplication of the pulse train, so that instead of having a train of equal energy/intensity pulses, the pulses alternate between large and small energy, with the difference between them depending on the degree of trailing edge clipping by the Q-switch. Thus, the method of the Adams' patent cannot be used to achieve substantial pulse shortening.

Another theoretically possible technique for controlling the pulse width of a Q-switched laser is use of an aggressive Q-switch window terminating prior to the conclusion of the natural pulse set by the gain and energy extraction dynamics of the laser cavity. After opening the Q-switch to initiate pulse build-up, the Q-switch would be set back to a high loss state at some point, quickly reducing the circulating intensity and effectively clipping off the falling edge of the pulse. This could be implemented using many different types of Q-switches, including both electro-optic and acousto-optic varieties.

For low repetition-rate lasers where the pulse repetition frequency (PRF) is much lower than 1/(upper state lifetime), this pulse-clipping technique can shorten pulses effectively. The method has some efficiency cost compared to the free-running laser without pulse clipping, though, since stored energy is left behind in the gain medium and the long re-pumping times ensure that little or none of the energy left behind will be available for use by the following pulses.

At a PRF much higher than 1/(upper state lifetime), pulse-clipping is potentially much more advantageous, but also more complicated. Because the pulse is clipped by the Q-switch before the gain drops below the loss level, clipping off the falling edge of a pulse allows the residual net gain left behind after the shortened pulse to be seen by the following pulses, since the time between pulses is much less than the lifetime of the gain medium. For internally frequency converted lasers this could, in principle, be a significant advantage, since the low-nonlinear optical (NLO)-conversion-efficiency tail of the pulse would be clipped away and that stored energy saved for conversion at higher intensities and efficiencies in subsequent pulses.

In practice, however, this otherwise attractive scheme for internally frequency converted lasers typically allows only minimal pulse shortening and moderate improvements in efficiency before running into inherent stability limitations. As the Q-switch window (time between initiation of build-up and clipping of the pulse) decreases progressively and more gain is left behind after the pulse is clipped, a mechanism for communication between pulses develops which quickly destabilizes the pulse train. Thus, a solution to this gain-mediated instability problem is necessary for Q-switch pulse clipping to be a useful technique.

A simple model for the laser dynamics illustrates the stability problems that arise when pulse length is modified by clipping of the pulse trailing. This simple model is for a purely linear laser, i.e. no nonlinear output coupling, but serves to illustrate the stability issues which can occur in both linearly and nonlinearly output coupled lasers. Consider the two equations (1) and (2) for circulating power P and gain g in a linear laser in the high PRF limit. For the sake of simplification, we assume the pulse to be sufficiently short that re-pumping of the gain medium during the pulse can be ignored for determining pulse dynamics.

$$T_{RT}\frac{dP}{dt} = (g-l)P \qquad \text{Eq. (1)}$$

$$\frac{dg}{dt} = -gP/E_{sat} \qquad \text{Eq. (2)}$$

The laser parameters included in this model are the cavity round trip time $T_{RT}$, the cavity loss l, and an effective gain medium saturation energy, $E_{sat}$, which depends on the saturation intensity of the gain medium and the cavity mode interaction with the gain medium (number of passes, mode size, etc.)

Fundamentally, a minimum condition for laser pulse train stability requires that a small perturbation (in gain, for example) on a particular pulse not be amplified in its impact on subsequent pulses. If such amplification occurs, the perturbation can eventually lead to undesirable behaviors such as period doubling. The laser described by the above-coupled equations above exhibits such instability if the circulating intensity is clipped during the pulse by an aggressively short Q-switch window. The same behavior occurs in internally frequency converted Q-switched lasers unless pains are taken to stabilize the pulse train as described below.

Figure 1A:
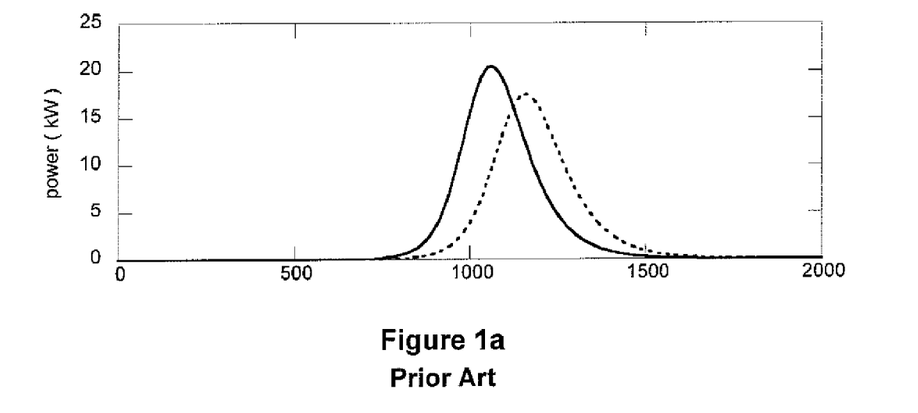
FIGS. 1a to 1c graph the circulating intracavity power (a), gain levels (b), and gain difference (c), of a prior art laser as a function of time for two initial gain conditions, calculated by numerical solution of the coupled equations for two slightly different initial gain conditions.
Figure 1B:
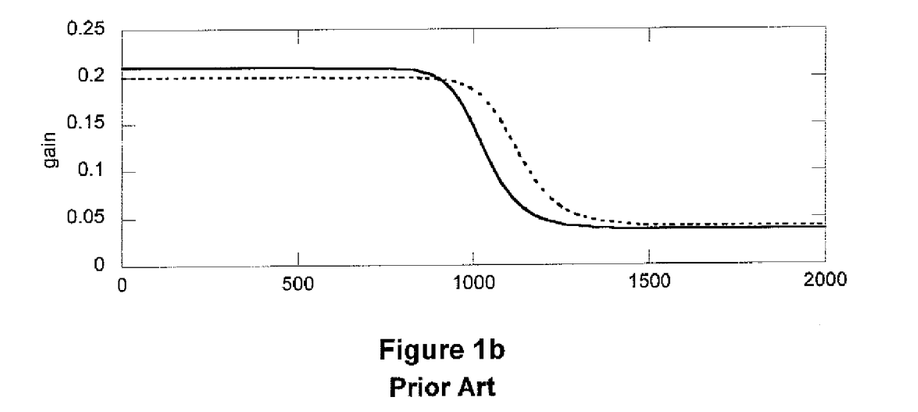
Figure 1C:
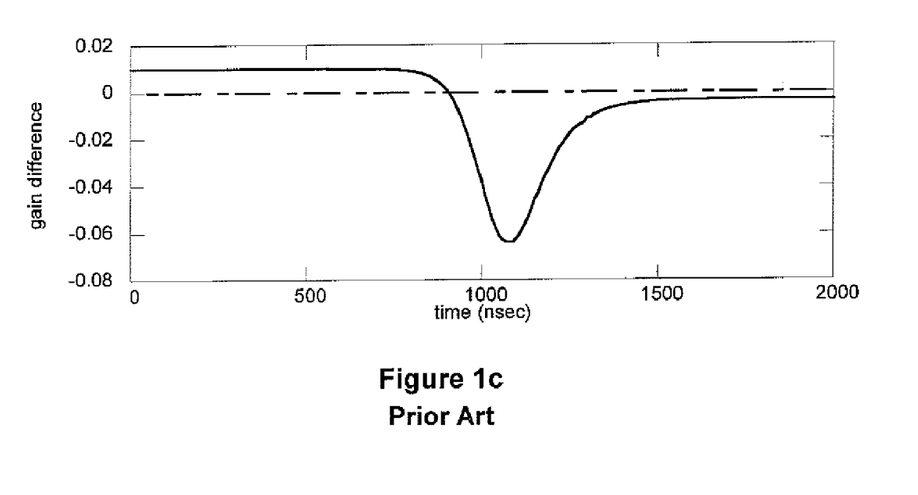

FIGS. 1a, 1b shows an example of prior art intracavity powers and gain levels as a function of time calculated by numerical solution of the coupled equations for two slightly different initial gain conditions. The intensity builds up at a rate set by the initial gain level, extracts energy from the gain medium, and finally decays as the gain level eventually falls below the cavity round trip loss level. The additional curve in FIG. 1 shows the difference in instantaneous gain at time T after the Q-switch is opened to initiate pulse build-up for the two initial conditions. The initial gain difference remains almost constant through the pulse build-up phase, but once significant energy extraction begins, a much larger difference in gain exists for most of the pulse duration. After the circulating intensity decays away, the instantaneous gain difference drops to a value lower than the initial gain difference at time t+0.

If we now suppose that a Q-switch were turned back to a high loss state at time T, we can infer the impact on stability by examining the gain differences existing at that time. If time T occurs significantly after the pulse intensity has decayed away, the gain difference at time T will always be less than or equal to the original gain level and the laser will be at least marginally stable, since any perturbation will decay away in time, however slowly. As soon as the time T begins to encroach on the pulse falling edge, though, the gain difference at time T can be significantly larger than the input gain difference. Any gain fluctuations will then be amplified in their effect on subsequent pulses. Defining a ratio of the gain difference at Q-switch closing time t=T to the initial gain difference at t=0 in the limit of small gain fluctuations, we see that pulse train stability with pulse clipping requires the minimum condition according to equation (3).

$$\left|\frac{dg(T)}{dg(0)}\right| < 1 \qquad \text{Eq. (3)}$$

When the quantity in equation 3 is less than 1, any gain fluctuations will be damped in their effect in subsequent pulses; the smaller the quantity, the more quickly any fluctuations will damp away and the more stable the laser will be.

Examining the gain difference curve in FIG. 1c, the condition in equation (3) is met at times t=T much longer than the pulse, but is violated when the pulse is clipped significantly by the Q-switch. As a result, only minimal pulse shortening and control is possible using the Q-switch without pulse train destabilization.

This can be understood intuitively in a repetitively Q-switched laser the following way. Extra gain is available for a first pulse, which builds up more quickly and extracts more stored energy, leaving less gain available for the following pulse. Seeing less gain, that second pulse builds up more slowly and extracts less energy, leaving the right initial conditions for a yet larger first larger pulse.

Figure 2A:
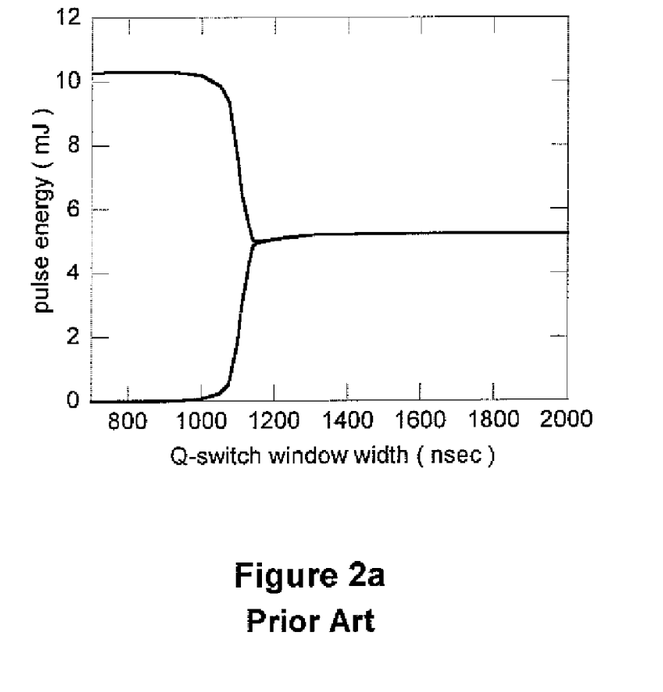
FIGS. 2a and 2b graph the pulse energy and width of a prior art laser as a function of Q-switch window illustrating pulse amplitude instability and bifurcation respectively.
Figure 2B:
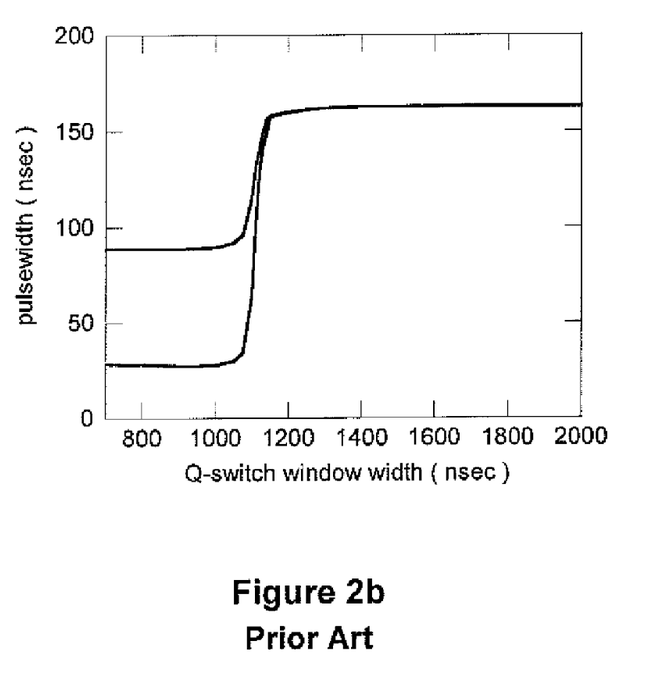

FIGS. 2a and 2b show an example of the results of numerical simulations of the impact of the Q-switch clip time on pulse width in a prior art laser prone to this instability. As the Q-switch window (time between opening at time 0 and closure at time T) is reduced and begins to clip the failing edge of the pulse, a bifurcation in pulse energy (FIG. 2a) and pulse width (FIG. 2b) occurs, so that the pulse train contains alternating large and small pulses. As the window is closed yet further, the energy of the smaller pulse quickly goes to zero, so that the laser reaches threshold only on alternating Q-switch events and the repetition frequency is halved.

Such behavior can be observed in high repetition rate linearly and nonlinearly output coupled lasers when the Q-switch gate is reduced. In practice, pulse stability sets the practical lower bound on the width of the Q-switch window and prevents aggressive Q-switch clipping from being a useful technique for pulse width control.

The origin of the large gain differences and resulting instabilities is primarily timing delay between the pulses. The pulse intensity envelope and gain behavior are not so different for the two curves plotted in FIG. 1a-1c. If they could somehow be shifted to overlap properly in time, the stability condition in equation (3) could be met for clipping at an arbitrary time T. The timing of the pulses is determined primarily by the build-up time, which is inversely proportional to the gain available at the start of the pulse.

Ultimately, this stability problem arises because the energy extraction (during the pulse) occurs on a time scale which is short relative to the overall build-up time, so that small fluctuations in build-up time cause sufficient shifts in pulse timing to leave large gain discrepancies. If the build-up time were substantially shorter (i.e., if the circulating intensity were already macroscopic when the Q-switch opens), the stability against pulse clipping would be significantly enhanced, since any gain fluctuations would generate much smaller timing shifts.

However, achieving such a stable enhanced circulating intensity before opening the Q-switch is difficult given the proximity to the laser threshold intensity. Techniques such as pre-lasing and injection seeding can be used to raise the circulating intensity before a Q-switched pulse, but both have significant limitations (single frequency lasers, ring lasers, etc.).

It is worth noting that pulse timing is not the only source of pulse instability. Higher order transverse modes, if present, can also couple subsequent pulses and have been observed to cause similar period-doubling instabilities. Hence, the analysis here applies primarily to single transverse mode lasers.

The invention disclosed here takes a counterintuitive approach to pulse shortening. Increasing the nonlinear outcoupling in an internally frequency converted laser typically results in longer pulse lengths, all other things being equal, since the intensities are reduced and energy extraction from the gain medium is less rapid. However, increasing the nonlinear outcoupling also yields a significant benefit.

The additional nonlinear coupling in accordance with the invention disclosed here makes the pulse much more stable against reductions in the Q-switch gate width which would otherwise cause pulse instabilities. As a result of the increased non-linear outcoupling, the gate width can then be greatly reduced, to the point where the pulse length is determined primarily by the build-up time and Q-switch gate width rather than only by the dynamics of energy extraction from the gain medium. Since energy extraction dynamics no longer determine the pulse width, the pulse width can be reduced far below what is possible by optimizing the nonlinear output coupling and gain dynamics. This enables operation of intracavity frequency-converted lasers in an entirely new pulse width regime with much shorter pulses than are achievable through variation in the laser parameters alone.

The conditions in accordance with one aspect of the invention are now considered, under which a laser overcomes the previously presented stability problem, allowing pulse clipping and enabling the decoupling of the pulse width (equivalently pulse duration) from pulse energy and pulse repetition rate.

The key to this invention is the proper choice of the nonlinear coupling to achieve a residual level of gain in the gain medium, after the pulse is clipped at time T and the circulating intensity decays away, which is independent of the initial gain value present in the gain medium before the pulse build-up began. We define this point as the gain fluctuation insensitive nonlinear coupling level. Under ideal Gain Fluctuation Insensitivity Conditions, the quantity in equation (3) would be approximately zero for all values of time T after the pulse intensity peak, so that the pulse train would have maximum stability against behaviour such as period doubling, enabling aggressive pulse clipping without causing instability. As is clear from equation 3, however, stable pulse-clipped laser operation is possible over some range of nonlinear output coupling levels around the ideal gain independent condition as long as the absolute value of the quantity in equation 3 is less than 1. Therefore operation near the ideal gain fluctuation insensitive condition is sufficient to achieve the benefits accorded by this invention.

Since the analytical and numerical models presented below to explain and illustrate the invention and the required Gain Fluctuation Insensitivity Condition are necessarily simplified for clarity, they do not capture all aspects of laser operation. For example, the simplified model does not include spatial gain saturation effects, using instead a constant effective saturation energy to describe the energy extraction behaviour of the pulse. Similarly, complicating effects in the frequency conversion process such as saturation of conversion efficiency at high intensities and high initial gains are not included. Pushed into the regime of large non-ideal effects, for example very high circulating intensities that predict greater than 100% conversion per round trip, the simple model will clearly be inadequate for prediction of gain fluctuation insensitive behaviour.

However, we demonstrate that gain fluctuation insensitive nonlinear output coupling conditions are clearly identifiable by numerical calculation over a wide and useful range of initial gain values, where more complicated effects do not dominate the laser pulse behaviour. Actually, given that stable operation is achievable over a range around the ideal gain independent condition, the benefits of operating near the gain independent condition will be obtainable to some degree even in the regime where effects beyond those included in the simple model become significant. For this reason, it is also possible that a single laser could achieve the benefits of gain fluctuation insensitive nonlinear coupling at some pulse repetition rates, while not achieving it at others due to these kinds of additional effects.

The pulse behavior during the build-up and the decay phases can be described analytically for the case of second harmonic generation, which allows one skilled in the art to estimate the conditions necessary for gain insensitivity and pulse train stability. Subsequent numerical analysis will lay out that condition more precisely.

To estimate analytically the Gain Fluctuation Insensitivity Condition for a nonlinearly coupled second harmonic generation laser, the same parameters are used as above except for the addition of an output coupling which is proportional to the square of the circulating power (second harmonic generation). Since the output of this laser is at the second harmonic and the linear cavity losses can be minimized as is known in the art, the linear losses will be neglected. Thus, equations 1 and 2 can be rewritten as equations 4 and 5 respectively.

Equation 4 includes α, which determines the magnitude of the nonlinear output coupling by second harmonic generation:

$$T_{RT}\frac{dP}{dt} = gP - \alpha P^2 \quad \text{Eq. (4)}$$

$$\frac{dg}{dt} = -\frac{gP}{E_{sat}} \quad \text{Eq. (5)}$$

The second-order nonlinear system defined in equations (4) and (5) has a one-parameter family of solutions which can be written in closed form as expressed in equations (6, 7).

$$P(t) = \frac{E_{sat}}{t - T_0}, \; g(t) = \frac{\alpha E_{sat} - T_{RT}}{t - T_0}. \quad \text{Eq. (6, 7)}$$

These exact solutions are not physical, in that the power and the gain increase without bound as the time goes back to the integration constant $T_0$. However, this special family is asymptotically close to the decay behavior of the desired solutions if the SHG coupling a is large compared with $T_{RT}/E_{sat}$.

During the decay, the gain is less than the nonlinear loss, so that g<αP. The special family has g=($\alpha T_{RT}/E_{sat}$)P, and thus the solutions satisfy ($\alpha T_{RT}/E_{sat}$)P<g<αP during the decay. If α>>$T_{RT}/E_{sat}$, then the solutions are closely bounded and are nearly equal to the special solutions during the decay period. Two initial conditions apply: a small noise power $P_{initial}$ and some finite gain, $g_i$, which will determine the value of $T_0$ for the correct asymptotic decay curve.

During the build-up of the pulse, the power increases exponentially, as expressed in equation (8):

$$P(t) = P_{initial} \exp(g_i t / T_{RT}), \quad \text{Eq. (8)}$$

The gain is thus nearly constant.

In between the build-up and the decay is the peak part of the pulse—the last part of the rise and first part of the decay—where all terms in the differential equations are important and no general formulas are available. Fortunately, the duration of this peak is short and relatively little gain is depleted during this part of the pulse evolution. Thus, to a simplest approximation, the build-up and decay behavior can be matched directly, as expressed in equation (9):

$$t_p = \frac{T_{RT}}{g_i} \ln(P_p / P_{initial}), \quad \text{Eq. (9)}$$

where $P_p$ is the peak power. From the decay behavior, the time of the peak is approximately $$t_p = \frac{\alpha E_{sat} - T_{RT}}{g_i} + T_0, \quad \text{Eq. (10)}$$

where $T_0$ is again the free parameter of the special family.

In general, this connection (the two expressions for $t_p$) will imply the dependence of $T_0$ on $g_i$, $P_{initial}$, and on the laser parameters α, $E_{sat}$, and $T_{RT}$. Now the strong condition is imposed that $T_0$ be independent of the initial gain $g_i$, so that all pulses decay along the same curve independent of the initial gain value before the pulse. This ensures that the final gain behavior is independent of the initial gain and there can be no communication or interaction between pulses. In that case $T_0$ must be identically zero, which implies that $$\alpha_{gfi} \approx \frac{T_{RT}}{E_{sat}}[\ln(P_p / P_{initial}) + 1]. \quad \text{Eq. (11)}$$

The nonlinear output coupling value for achieving the Gain Fluctuation Insensitive Condition, $\alpha_{gfi}$, depends on the initial intensity circulating in the cavity before the Q-switch opens, with higher nonlinear coupling required for lower initial intensity levels. Since the pre-pulse circulating power in almost all Q-switched lasers is many orders of magnitude below the peak power, the factor in square brackets is much larger than unity, and the term "+1" can be neglected.

In the analysis of nonlinearly-output-coupled peak power, pulse width, and efficiency, Murray and Harris determined an optimal coupling point α, $$\alpha \approx T_{RT}/E_{sat} \; (\beta+1 \text{ in the original paper}), \quad \text{Eq. (12)}$$

at which the highest harmonic peak power was achieved, the efficiency was close to the maximum, and the pulse width had increased only a small fraction over the minimum value. As the nonlinear output coupling is increased beyond the optimal value determined by Murray and Harris, the pulse width will only lengthen further. For nonlinear coupling values lower than this value, the pulse width of a nonlinear-output-coupled second harmonic generation laser is approximately constant at value we define here as the Characteristic Minimum Pulse Width achievable by a laser having the same parameters (other than the nonlinear coupling, which is being varied).

Compared to the nonlinear coupling value optimized for harmonic peak power as disclosed in the prior art of Murray and Harris, it can be seen that the Gain Fluctuation Insensitive Condition will typically require many times (a factor of the order of 20) greater nonlinear output coupling.

As a result of this unusually large nonlinear coupling required to achieve the Gain Fluctuation Insensitive Condition, the free-running pulse width (without pulse clipping) of laser disclosed herein will be much longer than in the optimally nonlinearly-coupled case. However, because of the enhanced pulse train stability, the disclosed laser will now be stable against Q-switch clipping of the pulse falling edge and dramatic shortening of the output pulse widths will be possible. Thus, the laser operating at the Gain Fluctuation Insensitive Condition and using pulse-clipping will be able to generate output harmonic wavelength pulses much shorter than the Characteristic Minimum Pulse Width identified by Murray and Harris.

More detailed investigation into the conditions for maximal pulse train stability requires numerical simulation of the coupled equations to connect the build-up to the pulse decay through the region of peak nonlinear conversion. For the simulations of another embodiment $E_{sat}$ is taken to be 3 mJ, $T_{RT}$ is taken to be 5 ns, and the initial noise input is taken to be 10 μWatt to model approximately the experimental results presented in the following section.

Figure 3:
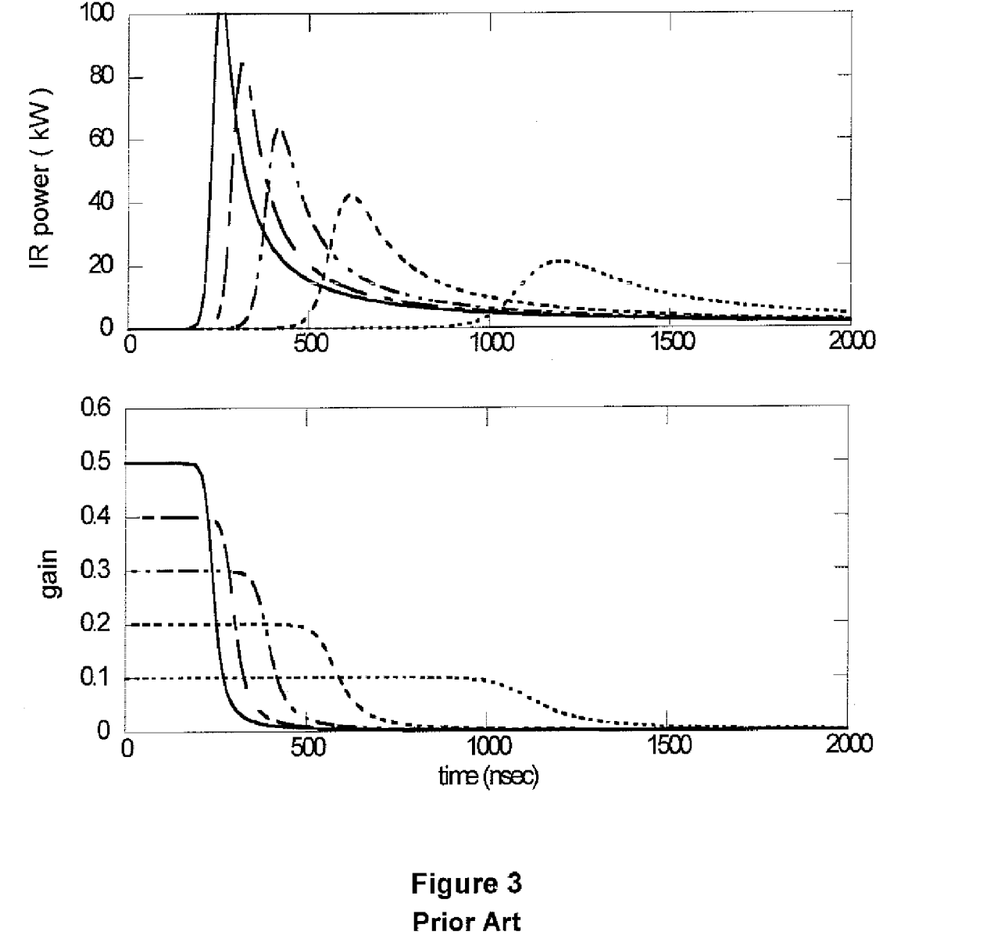
FIG. 3 graphs the numerically simulated circulating intensity and gain as a function of time for several initial gain levels when the nonlinear coupling level is a 0.00166/kW, corresponding to the prior art value optimized for maximum harmonic peak power as published by Murray and Harris for these conditions.

FIG. 3 shows the circulating infrared power intensity and gain as a function of time for several input gain levels while applying the "optimal" nonlinear coupling level of α=0.00166/kW for maximum harmonic peak power as determined by Murray and Harris in prior art. For these conditions, the nonlinear coupling level is far short of the value required for gain fluctuation insensitivity.

Pulses with higher initial gain levels reach their peak intensity and decay earlier in time, leading to large post-pulse gain differences and pulse train instability if the pulse were clipped shortly after the intensity peak.

Figure 4A:
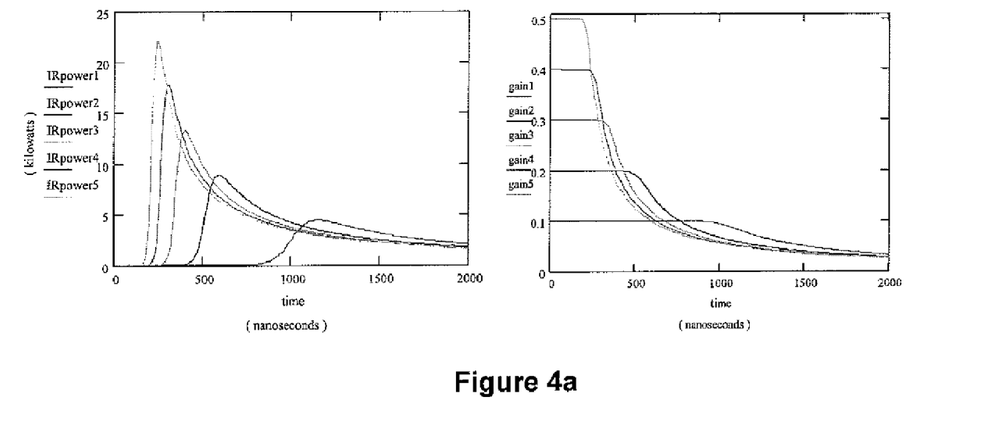
FIGS. 4a to 4c show the numerical simulation results for a laser generating intracavity second harmonic output in accordance with this invention, with graphs of the circulating intensity and gain as a function of time for several initial gain levels, for the nonlinear coupling values, α, of 0.0175/kW (4a), 0.035/kW (4b, the gain fluctuation insensitivity condition) and 0.070/kW (4c).
Figure 4B:
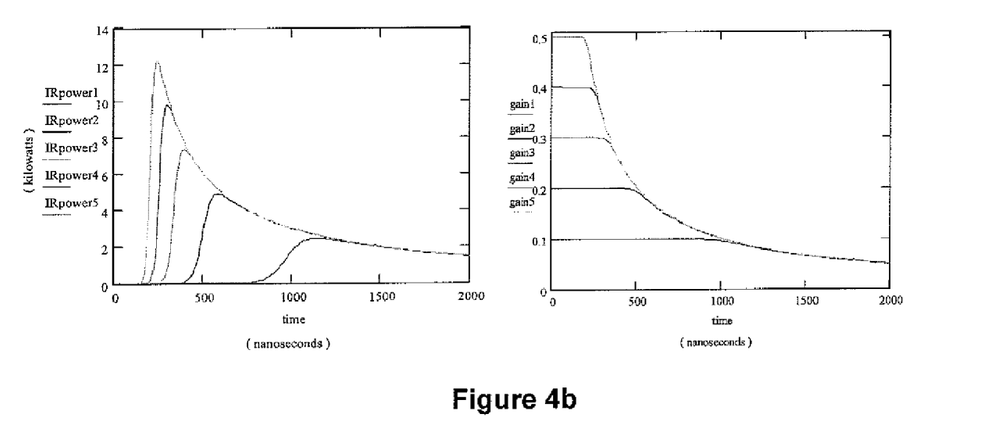
Figure 4C:
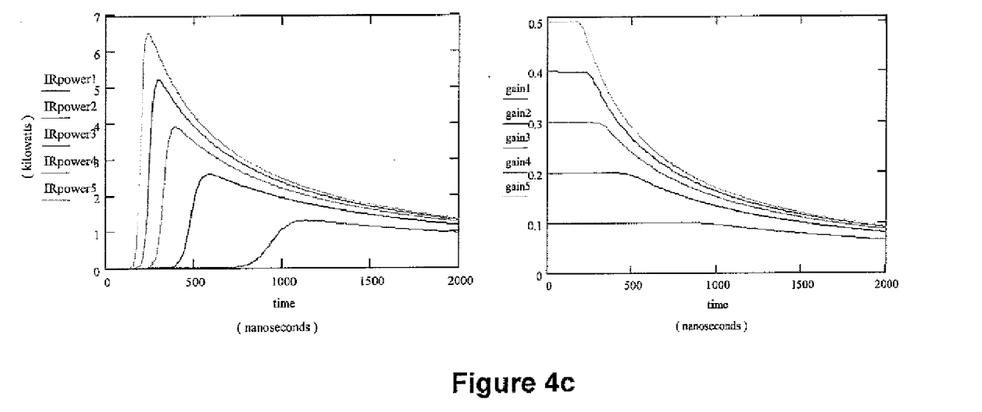

Levels of nonlinear coupling near the gain fluctuation insensitive condition α=0.035/kW are used in accordance with this invention. This level is determined empirically by observing the overlay of the curves in time. For comparison, using typical values of $P_p$=10 kW and $P_{initial}$=10 μWatt, equation (11) predicts α=0.033/kW. 4a to 4c show the numerical simulation results for a laser generating intracavity second harmonic output in accordance with this invention, with graphs of the circulating intensity and gain as a function of time for several initial gain levels, for the nonlinear coupling values, α, of 0.0175/kW (4a), 0.035/kW (4b, the gain fluctuation insensitivity condition) and 0.070/kW (4c).

As expected at the Gain Fluctuation Insensitivity Condition shown in FIG. 4b, the individual gain curves all fall onto a single universal curve for times slightly after the intensity peaks, despite the substantial difference (factors of about 5 times) in initial gain values shown. The intensity curves also fall onto a similar universal decay curve at a time shortly afterward. It is important to note that the same basic behavior occurs if linear losses and re-pumping are included, although at low initial gain values some deviation from the ideal curve is observed due to the greater relative importance of the linear losses. FIGS. 4a and 4c, in which the nonlinear coupling is decreased and increased by a factor of 2 from the Gain Fluctuation Insensitivity Condition, illustrate that stability can be achieved over some range around the ideal condition, as is indicated by equation (3). No large differences in gain appear after the pulse intensity peaks, unlike in the more typical prior art situation illustrated in FIG. 3.

When the pulse falling edge is clipped by the Q-switch and significant gain is left behind after the pulse, the background gain level will rise. As this gain level rises, the build-up time will shorten, the peak intensity will increase, and the efficiency of conversion to the harmonic will increase as a result. A new equilibrium will be reached when the power extracted by the nonlinear conversion during the Q-switch open period increases to equal (modulo any additional power lost from linear cavity losses) the available power/pulse at the relevant repetition rate.

This decoupling of background gain level from individual pulse energy has significant implications for laser operation. For a laser without pulse clipping, the build-up, peak intensity, and nonlinear conversion efficiency are set by the energy (gain) available for use by that particular pulse, since all net gain is extracted by each pulse. As the repetition rate of such an internally frequency converted laser increases, the output power at the harmonic will typically drop.

In contrast, a pulse-clipped laser with increased background gain level could in principle keep the same pre-pulse gain level as the PRF increases, preserving the peak intensity, nonlinear conversion efficiency, and overall laser output power at the harmonic wavelength. Hence, clipped-pulse operation should enable significant PRF independence, particularly at very high PRF values.

There are obviously some constraints on the effectiveness of this technique, as the periodic cavity dumping of circulating intensity throws energy away. This loss increases with repetition rate, since the cavity dumping occurs more frequently, and with increasing circulating intensity, since more power will be thrown away with each cavity dumping event.

Another intuitive way of understanding this Gain Fluctuation Insensitivity Condition is to see that each pulse automatically removes exactly the right amount of energy to leave behind the same residual gain regardless of Q-switch window width. Therefore, any perturbations are removed by a single pulse and have no impact on subsequent pulses.

The case of gain fluctuation insensitive nonlinear coupling for third harmonic generation is not so amenable to analytical analysis, and so must be investigated by numerical methods. We model a laser with similar parameters to the previous numerical example, but now include both second harmonic and third harmonic generation terms, so that equation 4 must be replaced by equation 13 to account for the additional nonlinear conversion stage. Note that all radiation generated at second and third harmonic wavelengths is output coupled from the laser cavity.

$$T_{RT} \frac{dP}{dt} = gP - \alpha P^2 - \alpha P^2 \sin^2(\sqrt{\beta P}),\qquad \text{Eq. 13}$$

Figure 8A:
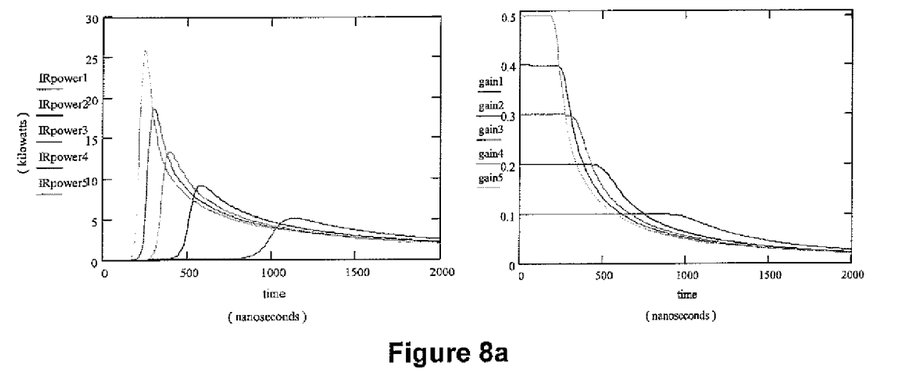
FIGS. 8a to 8c show the numerical simulation results for a laser generating intracavity third harmonic output in accordance with this invention, with graphs of the circulating intensity and gain as a function of time for several initial gain levels, for the nonlinear coupling set to half (8a), equal to (8b), and double (8c) the level to achieve the Gain Fluctuation Insensitivity Condition.
Figure 8B:
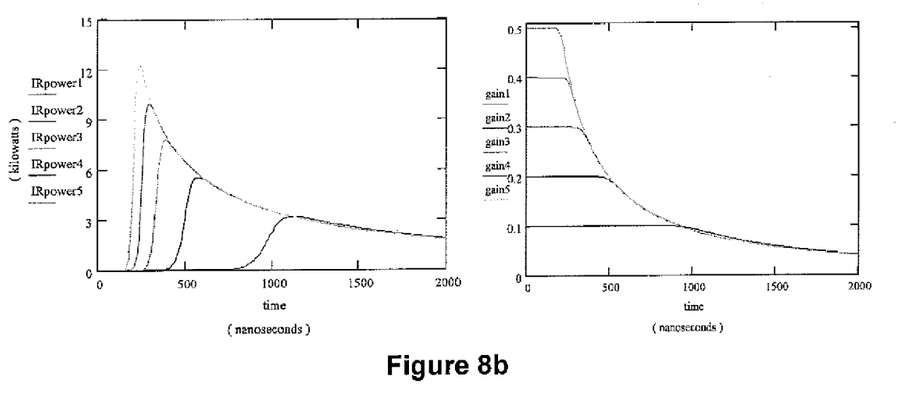
Figure 8C:
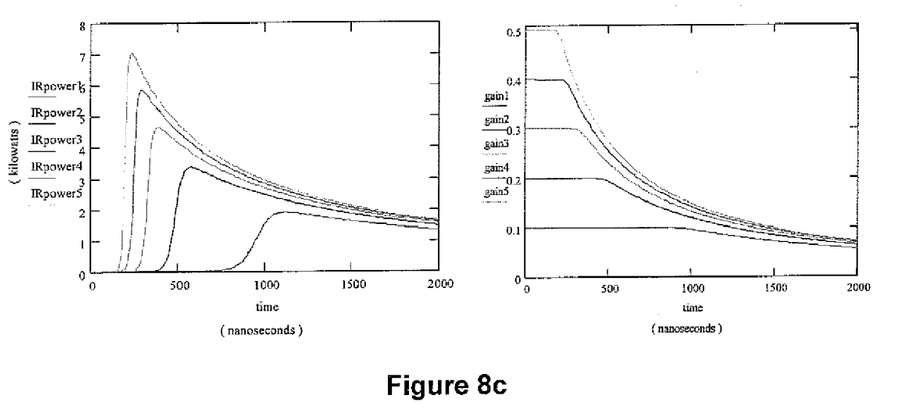

In equation 13, α is again the second harmonic nonlinear output coupling and β now sets the level of coupling from the fundamental and second harmonic to the third harmonic. For this simple model of third harmonic generation, a Gain Fluctuation Insensitive level of nonlinear output coupling can be clearly identified by numerical simulation, as is illustrated in FIGS. 8a, b, and c. The gain vs. time curves in FIG. 8b clearly show that a gain fluctuation insensitive nonlinear output coupling has been achieved, as the gain curves join the "universal" gain decay curve shortly after the fundamental intensity peak, just as was observed for the second harmonic generation case investigated previously. In this case there is no single parameter for the Gain Fluctuation Insensitive Condition, since the second harmonic coupling coefficient and the third harmonic coupling coefficient both affect the gain behaviour. For the Gain Fluctuation Insensitive Condition example shown in FIG. 8b, α=0.0175/kW, while β=0.2/kW. FIGS. 8a and 8c show the same laser with the alpha decreased (α=0.00875) and increased (α=0.035) by a factor of 2. Gain fluctuation insensitive operation is therefore achievable in the case of nonlinear output coupling by third harmonic generation and will allow pulse width reduction by aggressive Q-switch pulse clipping in a similar manner.

It should be realized that lasers enabled by this invention can be used in many different applications and modified in many different ways while remaining within the scope of the invention. Lasers enabled by this invention can be used for material processing, scientific, medical, remote sensing, and security applications. Specific parts of the laser can be modified such as the type of gain medium such as solid-state, liquid, or ion and the number of separate gain media used in the laser. The types of nonlinear materials or the number of separate nonlinear materials or crystals used to accomplish nonlinear frequency conversion can change. External frequency conversion of the enabled laser output beam after output coupling from the laser could be used to further change the frequency of the laser radiation. The method of pumping could change to include laser diodes, lamps, or electrical discharge. Both single and multi-transverse lasers and single or multi-longitudinal modes laser could be built using this invention. Finally, seeding techniques could be used in conjunction with this invention to modify pulse buildup times and gain-independent conditions.

SUMMARY OF THE INVENTION

The invention discloses an actively Q-switched laser with an intracavity nonlinear output coupler in which a stable optical frequency converted output is generated. A Gain Fluctuation Insensitivity Condition is defined and described for several examples. The nonlinear output coupler with a coupling level which satisfies this Condition permits stable laser operation with minimal interaction between pulses, even when the pulses are clipped by the Q-switch. Thus, the output pulse duration and repetition frequency of the disclosed laser can be varied over a large range substantially independent of laser gain level and dynamics. Second and third harmonic optical frequency conversion is demonstrated, although the disclosed laser is applicable to other optical frequency conversion regimes as well.

BRIEF DESCRIPTION OF THE DRAWINGS

Exemplary characteristics of the invention will now be described in conjunction with the following drawings.

DETAILED DESCRIPTION OF PREFERRED EMBODIMENTS

Figure 9:
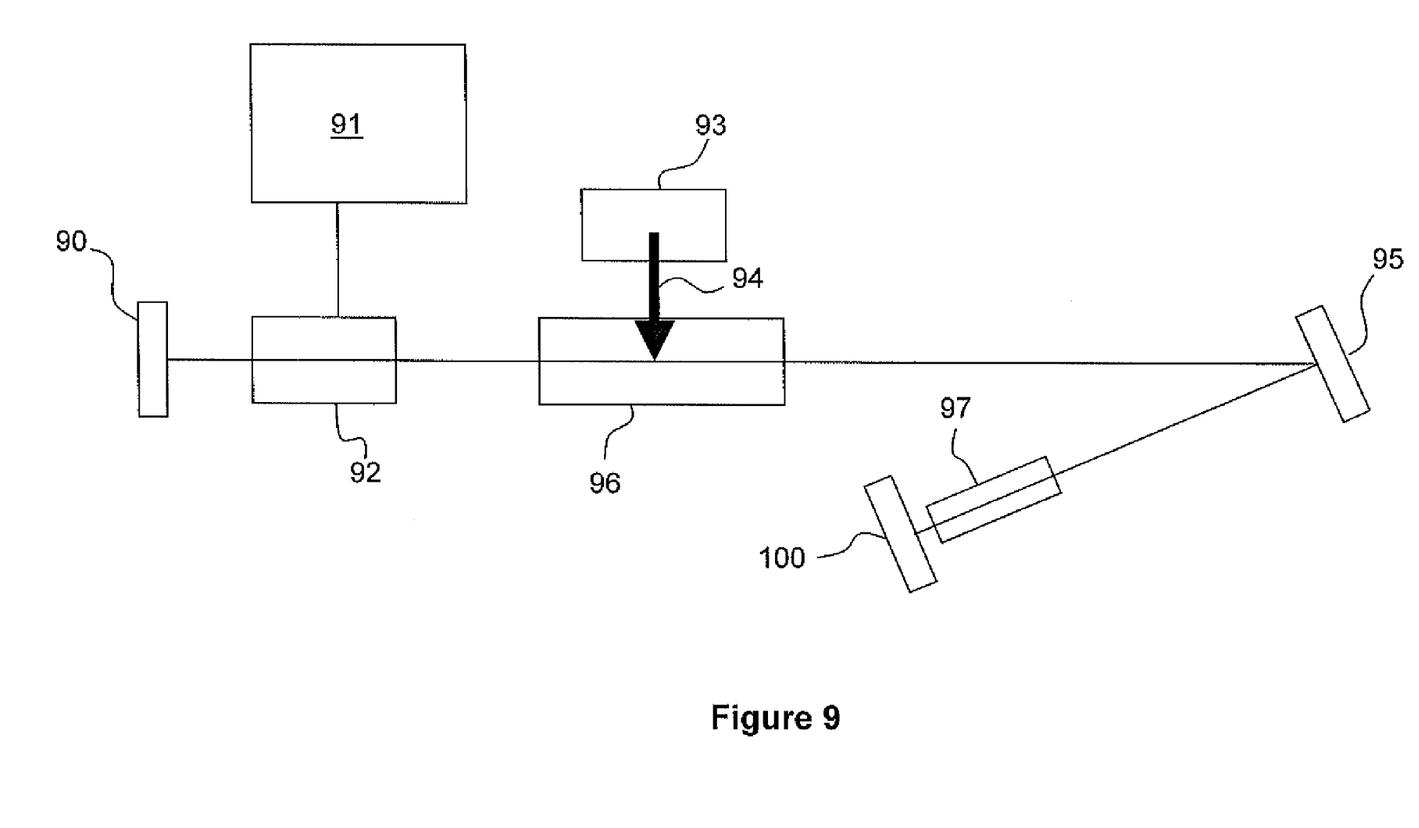
FIG. 9 illustrates one embodiment of the disclosed laser for generating second harmonic output pulses.

FIG. 9 shows schematically a preferred embodiment of this invention, similar to that which has been used to experimentally verify gain fluctuation insensitivity, pulse width variability and good PRF independence in an intra-cavity nonlinear output coupled laser operating in the second harmonic generation regime.

The resonant cavity of the laser utilizes a three mirror folded configuration. One end mirror 90 has a high reflectivity at the fundamental frequency of the laser. The folding mirror 95 is highly reflective at the fundamental frequency, but highly transmissive at all generated optical harmonics of interest. The other end mirror 100 is highly reflective at both the fundamental as well as the harmonic frequencies.

The gain medium 96 such as the dual Nd:YAG rods used in the experiment, located between end mirror 90 and folding mirror 95 in the path of the fundamental optical frequency only, is side-pumped by a high power optical beam 94 at a suitable wavelength, such as 808 nm from a pump source 93 consisting of 6 semiconductor laser diode bars emitting a power of 240 Watt. Although Nd:YAG material was used as the gain medium in this particular embodiment, other solid state materials such as Nd:YAG, Nd:YVO$_4$, Nd:YLF, Yb:YAG, or Nd:Gd$_x$Y$_{1-x}$VO$_4$ could in principle be used, either singly or in combination. The choice of gain material is not confined to the solid state, but can also be in the liquid or vapor phase, as is used elsewhere in the art.

A 20 mm long LBO crystal 97 cut for type 1 phase-matching for converting the fundamental wavelength of 1064 nm to its second harmonic at 532 nm provided ~0.04/kW of nonlinear output coupling level, which is near the Gain Fluctuation independence Condition for this laser cavity with a 5 ns round trip time and 3 mJ effective saturation energy.

Between end mirror 90 and folding mirror 95 the laser cavity also accommodates an acousto-optic Q-switch 92 whose RF "off" window or gate width can be varied to change the Q-switch low-loss window time seen by the laser cavity. The RF gate signal with an appropriate pulse repetition frequency (PRF) is generated in a signal generator 91.

Figure 5:
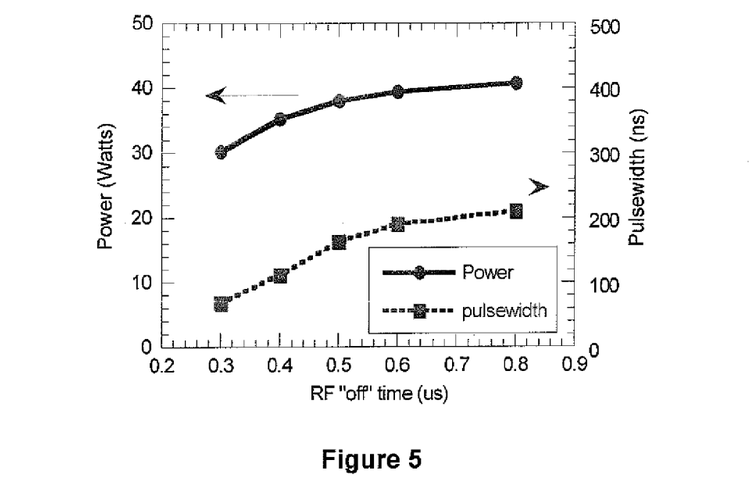
FIG. 5 graphs the measured power and pulse width of this laser as a function of Q-switch window width at a PRF of 100 kHz for gain fluctuation insensitivity condition.

FIG. 5 shows the measured power and pulse width of this laser as a function of Q-switch window width at a PRF of 100 kHz. By straightforward tuning of the acoustic RF "off" window length, the pulse width was variable without loss of pulse stability over a wide range. Some power reduction was observed at the shorter gate widths, presumably due to increasing overall losses associated with the periodic dumping of the higher cavity intensity.

Figure 6:
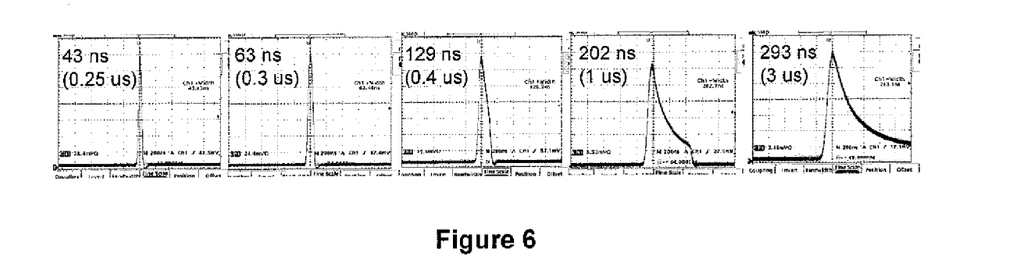
FIG. 6 shows oscilloscope traces of the temporal evolution of the pulses for 5 different output pulse FWHM values, (corresponding RF window widths in parentheses) for a PRF of 100 kHz, illustrating how the pulse tail is clipped away as the Q-switch window is reduced.

FIG. 6 shows oscilloscope traces of the temporal evolution of the pulses for five different values of FWHM pulse width, and the RF window widths (in parentheses) for pulse repetition frequency of 100 kHz, illustrating how the pulse tail is clipped away as the Q-switch window is reduced. The vertical scale on the oscilloscope has been adjusted in each case to accommodate the higher peak powers of the shorter pulses.

As is evident from the oscilloscope traces, no substantial bifurcation and period-doubling can be observed. The instabilities obtained with lower nonlinear output coupling have thus been eliminated. The low pulse-to-pulse noise level is evidenced by the oscilloscope traces in which many pulses are overlaid one on top of each other, even though the optical components of this laser were held by optical table jigs.

In the experiment described here the pulse length was changed manually over a timescale of seconds, however there are no indications that much faster changes should be problematic. In fact, within the constraints of a physically plausible "gain history" and the re-pumping rate, it should be possible in this laser embodiment to generate a very complicated pulse train with each pulse having a different pulse energy and width without inducing instability.

Figure 7:
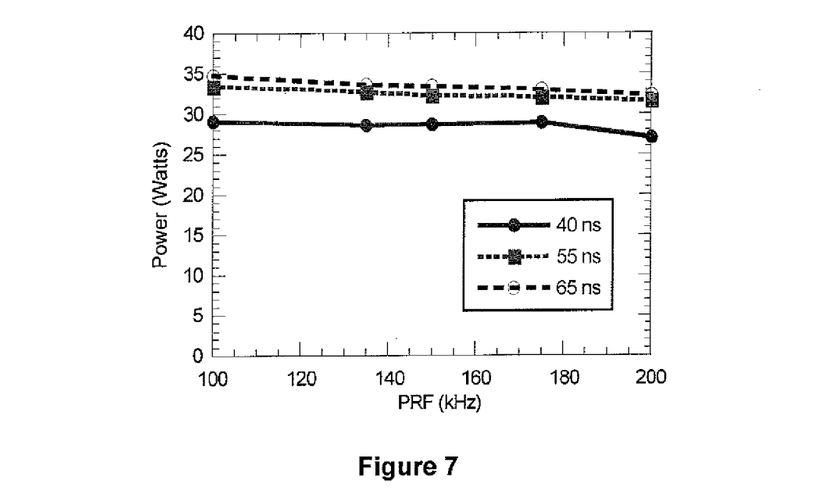
FIG. 7 graphs the output power performance of this laser as a function of PRF over the range 100 kHz-200 kHz with the output pulse FWHM held approximately constant at 40 ns, 55 ns, and 65 ns. At each PRF value, the RF window width was adjusted to achieve the desired pulse width.

FIG. 7 shows the performance of this laser over the PRF range 100 kHz-200 kHz for three different FWHM pulse widths held approximately constant at 40 ns, 55 ns, and 65 ns. At each PRF value, the RF window width was adjusted to achieve the desired pulse width. It can be seen that the average laser power output at the wavelength of 532 nm is nearly constant over the given PRF range, varying by only ~10%, despite the fact that the output pulse energy changes over the same range by a factor of 2.

Figure 10:
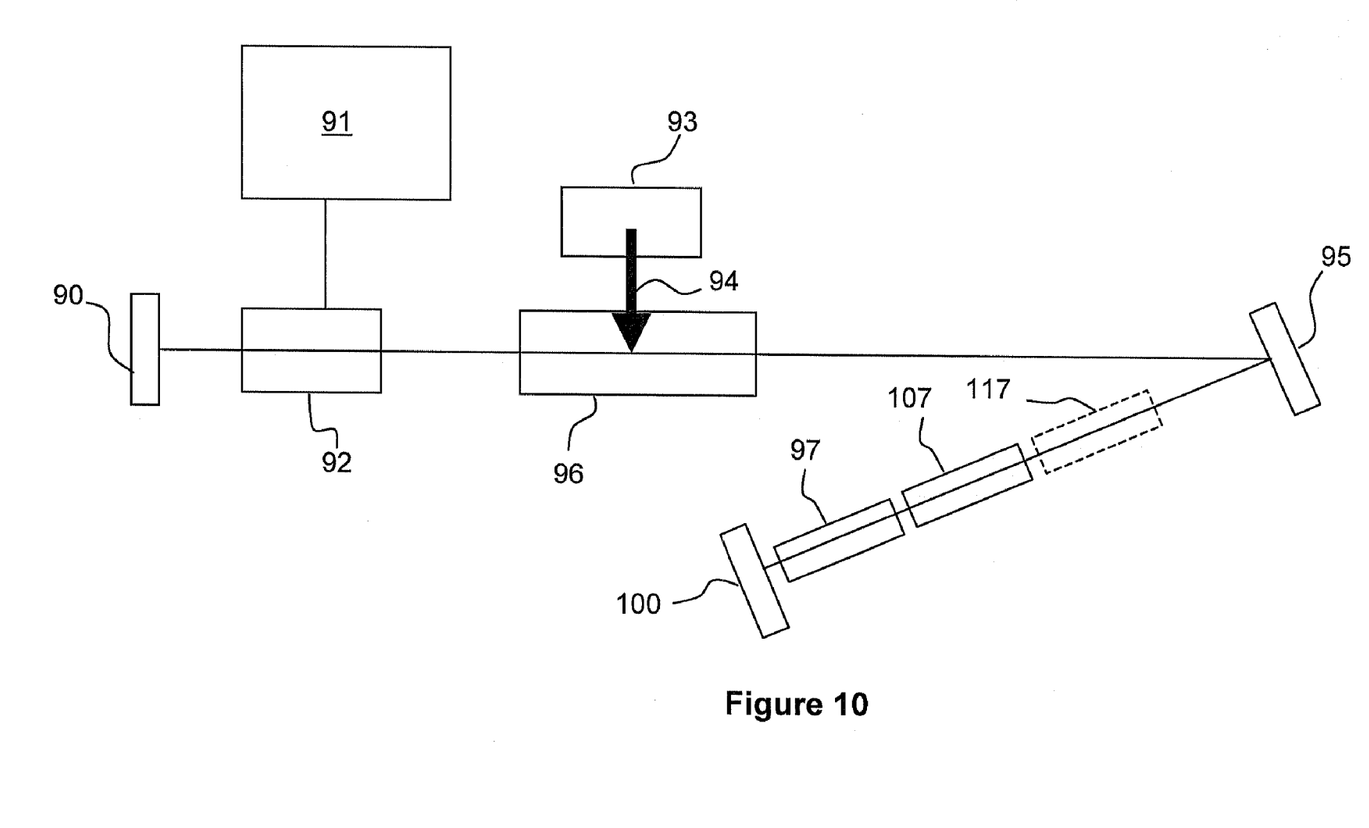
FIG. 10 illustrates a second embodiment of the disclosed laser for generating third and higher harmonic output pulses.

A second exemplary embodiment of this invention is shown schematically in FIG. 10, which is particularly suited for generating higher order harmonics or performing various combinations of optical frequency summing or subtraction. It is similar to the previous embodiment, but has provision for additional nonlinear couplers, as outlined below.

The resonant cavity of this laser also utilizes a three mirror folded configuration. One end mirror 90 has a high reflectivity at the fundamental frequency of the laser. The folding mirror 95 is highly reflective at the fundamental frequency, but highly transmissive at all generated optical harmonics of interest. The other end mirror 100 is highly reflective at both the fundamental as well as the harmonic frequencies.

Optical gain is provided by gain medium 96, which is located between end mirror 90 and folding mirror 95 in the path of the fundamental optical frequency only. It can be made of a solid state material such as Nd:YAG, Nd:YVO$_4$, Nd:YLF, Yb:YAG, or Nd:Gd$_x$Y$_{1-x}$VO$_4$ used either singly or in suitable combination with others. As before, the choice of gain medium is not restricted to solid state materials, but can also be selected from media in the liquid or vapor phase, as used elsewhere in the art.

The gain medium 96 is pumped by a high power optical beam 94 at a suitable wavelength emitted from a pump source 93.

Between end mirror 90 and folding mirror 95 the laser cavity also accommodates an acousto-optic Q-switch 92 whose RF "off" window or gate width can be varied to change the Q-switch low-loss window time seen by the laser cavity. The RF gate signal with an appropriate pulse repetition frequency (PRF) is generated in a signal generator 91.

The nonlinear coupler is located in the resonant cavity between folding mirror 95 and end mirror 100. It may consist of one or more components. For instance, one crystal 97 for second harmonic generation and another crystal 107 for third harmonic generation can be accommodated as shown in FIG. 10. Although only two crystals are shown in this case, the number is not restricted to two. A solid state material such as LiB$_3$O$_5$, BiB$_3$O$_6$, KTiOPO$_4$, LiNbO$_3$, KTiOAsO$_4$, or beta-BaB$_2$O$_4$ could be used either singly or in suitable combination with others.

The coupler material is not limited to crystals or solid state materials in general, but liquids and vapors with suitable nonlinear optical properties could be used as well.

There are other alternative embodiments of this invention, which one skilled in the art would recognize. The most significant ones include extension to other wavelengths such as third and fourth harmonic generation. These extensions would typically require additional crystals 117 to perform further frequency conversion steps, so that one laser would have first a second harmonic generation stage followed by a third harmonic stage to mix the fundamental radiation and second harmonic radiation to produce the third harmonic radiation.

Fourth harmonic generation could be obtained in two ways. First, a 3$^{rd}$ conversion step could be added to the third harmonic generation laser to mix the fundamental radiation and the third harmonic radiation to produce the fourth harmonic radiation. Alternatively, a second frequency doubling crystal could be added to a second harmonic generation laser to convert the second harmonic radiation directly to fourth harmonic radiation.

Further embodiments could be based on other frequency conversion processes that could take advantage of short pulse lengths such as sum frequency mixing. In all cases, the frequency conversion at any single stage could use one or more crystals to achieve the proper level of nonlinear output coupling for that stage in order to optimize the system for other conditions such as birefringent walk-off.

Still other embodiments could include multi-transverse mode operation instead of single transverse mode operation. In the embodiments described above as well as other similar ones in the art, the choice of gain fluctuation insensitive nonlinear output coupling will permit the same benefits to be achieved in accordance with this invention.

What is claimed is:

1. A Q-switched laser comprising:
a) a resonant cavity, containing therein a gain medium;
b) a pump source for increasing an optical gain within the gain medium to produce a primary optical circulating power at a fundamental optical frequency with a cavity round trip time within the resonant cavity;
c) a signal generator producing a gate signal having a gate width, and modulated at a pulse repetition frequency;
d) an optical switch within the resonant cavity, responsive to the gate signal received from the signal generator to change the optical switch from a high loss state to a low loss state for a duration of the gate width for producing a primary optical pulse with a primary optical pulse width;

wherein in the high loss state, energy accumulates within the gain medium to produce an initial optical gain, while the primary optical circulating power approaches an initial optical circulating power; and wherein in the low loss state, the primary optical circulating power increases to a peak optical circulating power, thereafter decaying as the energy accumulated within the gain medium diminishes and the optical gain is depleted;

e) a first nonlinear coupler within the resonant cavity for converting a portion of the primary optical circulating power into a first converted optical power at a second harmonic of the fundamental optical frequency, wherein the first converted optical power has a converted optical pulse width;

wherein a nonlinear coupling level, denoted by α, defined as a coefficient of $P^2$ in a rate equation, $$T_{RT}\frac{dP}{dt} = gP - \alpha P^2$$

satisfies the relationship $\alpha_{gi}/2 < \alpha < \alpha_{gi}*2$, wherein $\alpha_{gi}$ is defined by the relationship $\alpha_{gi} = T_{RT}/E_{sat}*20$, where $T_{RT}$ is the cavity round trip time, $E_{sat}$ is an effective gain saturation energy, g is optical gain, P is the optical circulating power, dP/dt is a first derivative of P with respect to time, $P_p$ is the peak optical circulating power, and $P_{init}$ is the initial optical circulating power; and wherein the converted optical pulse width is clipped to less than about 80% at full-width half-maximum (FWHM) of a characteristic minimum pulse width, defined as the pulse width produced in a Q-switched laser having the same parameters but in the limit of the nonlinear coupling level approaching zero; and f) an output coupler for coupling the first converted optical power out of the resonant cavity.

2. The Q-switched laser as defined in claim 1, wherein the gate width of the gate signal is adjustable, whereby the converted optical pulse width is variable in a range between about 40 ns and about 300 ns.

3. The Q-switched laser as defined in claim 1, wherein the pulse repetition frequency is adjustable between about 50 kHz and about 300 kHz.

4. The Q-switched laser as defined in claim 3, wherein an average output power at the converted optical frequency varies by less than ±15% as the pulse repetition frequency is adjusted.

5. The Q-switched laser as defined in claim 3, wherein the converted optical pulse width varies by less than ±5% as the pulse repetition frequency is adjusted.

6. The Q-switched laser as defined in claim 3, wherein the gate width of the gate signal is adjustable at a constant pulse repetition frequency, whereby the converted optical pulse width is variable within a range from about 40 ns to about 300 ns.

7. The Q-switched laser as defined in claim 1, wherein the first nonlinear coupler comprises one or more materials selected from the group consisting of $LiB_3O_5$, $BiB_3O_6$, $KTiOPO_4$, $LiNbO_3$, $KTiOAsO_4$, and beta-$BaB_2O_4$.

8. The Q-switched laser as defined in claim 1, wherein the gain medium comprises one or more materials selected from the group consisting of Nd:YAG, Nd:YVO$_4$, Nd:YLF, Yb:YAG, and Nd:Gd$_x$Y$_{1-x}$VO$_4$.

9. A method of operating a Q-switched laser comprising the steps of:

a) providing a first nonlinear coupler within a resonant cavity of the Q-switched laser for interacting with an optical circulating power, wherein the first nonlinear coupler has a nonlinear coupling level, denoted by $\alpha$, defined as a coefficient of $P^2$ in a rate equation, $$T_{RT}\frac{dP}{dt} = gP - \alpha P^2$$

which satisfies the relationship $\alpha_{gi}/2 < \alpha < \alpha_{gi}*2$;

where an approximate gain-insensitive nonlinear coupling level, denoted by $\alpha_{gi}$, is defined by the relationship $\alpha_{gi} = T_{RT}/E_{sat}*20$, where $T_{RT}$ is a cavity round trip time, $E_{sat}$ is an effective gain saturation energy, g is an optical gain, P is the optical circulating power, dP/dt is a first derivative of the optical circulating power with respect to time, $P_{init}$ is an initial optical circulating power, and $P_p$ is a peak optical circulating power;

b) pumping a gain medium in the resonant cavity of the Q-switched laser to increase the optical gain, g, for the optical circulating power within the gain medium;

c) switching a Q-switch from a high loss state to a low loss state to initiate a primary optical pulse at a fundamental optical frequency, thereby initiating a depletion of the optical gain accumulated within the gain medium;

d) converting, by means of the first nonlinear coupler, the primary optical pulse at the fundamental optical frequency to a secondary optical pulse at a second harmonic frequency having an output pulse width;

e) switching the Q-switch to the high loss state after a peak intensity of the primary optical pulse, thereby ending the primary optical pulse and stopping the depletion of the optical gain such that the secondary optical pulse width is clipped to less than about 80% at full-width half-maximum (FWHM) of a characteristic minimum pulse width, defined as the pulse width produced in a Q-switched laser having the same parameters but in the limit of the nonlinear coupling level approaching zero;

f) coupling the secondary optical pulse out of the cavity; and g) repeating steps b) to f).

10. A Q-switched laser comprising:

a resonant cavity, containing therein a gain medium comprising one or more rods of Nd:YAG;

a signal generator capable of generating an RF signal with an adjustable pulse width and an adjustable pulse repetition frequency;

a plurality of diode bars capable of emitting optical power for pumping the gain medium to produce an optical gain therein;

an acousto-optic Q-switch within the resonant cavity, wherein the application of the RF signal, received from the signal generator, changes the acousto-optic Q-switch between a low loss state and a high loss state, such that optical pulses at a circulating fundamental optical frequency are produced within the resonant cavity, the optical pulses having a pulse width between about 40 ns and about 300 ns and a pulse repetition frequency of between about 50 kHz and about 300 kHz in response to adjustments made to the RF signal; and a LBO crystal within the resonant cavity suitable for generating second harmonic output pulses from the optical pulses, and having a nonlinear output coupling level of about 0.02/kW to 0.08/kW, thereby providing a gain fluctuation insensitivity condition, wherein the second harmonic output pulses are clipped to less than about 80% at full-width half-maximum (FWHM) of a characteristic minimum pulse width, defined as the pulse width produced in a Q-switched laser having the same parameters but in the limit of the nonlinear coupling level approaching zero.

11. The method defined in claim 9, wherein the output pulse width is variable in a range between about 40 ns and about 300 ns.

12. The method defined in claim 9, wherein a pulse repetition frequency of the output pulse is adjustable between about 50 kHz and about 300 kHz.

13. The method defined in claim 12, wherein an average output power of the output pulse varies by less than ±15% as the pulse repetition frequency is adjusted.

14. The method defined in claim 12, wherein the output pulse width varies by less than ±5% as the pulse repetition frequency is adjusted.

15. The method of claim 12, wherein the output pulse width is variable within a range from about 40 ns to about 300 ns while the pulse repetition frequency is kept constant.

16. A method of operating a Q-switched laser comprising the steps of:

a) providing a first nonlinear coupler within a resonant cavity of the Q-switched laser for interacting with an optical circulating power, wherein the first nonlinear coupler has a nonlinear coupling level, denoted by $\alpha$, defined as a coefficient of $P^2$ in a rate equation, $$T_{RT}\frac{dP}{dt} = gP - \alpha P^2$$

which satisfies the relationship $\alpha_{gi}/2 < \alpha < \alpha_{gi}*2;$ where $\alpha_{gi}$ is defined by the relationship $\alpha_{gi} = T_{RT}/E_{sat}*20,$ where $T_{RT}$ is a cavity round trip time, $E_{sat}$ is an effective gain saturation energy, g is an optical gain, P is the optical circulating power, dP/dt is a first derivative of the optical circulating power with respect to time, $P_{init}$ is an initial optical circulating power, and $P_p$ is a peak optical circulating power;

b) providing a plurality of secondary nonlinear couplers within the resonant cavity of the Q-switched laser for interacting with the optical circulating power;

c) pumping a gain medium in the resonant cavity of the Q-switched laser to increase an optical gain for the optical circulating power within the gain medium;

d) switching a Q-switch of the Q-switched laser from a high loss state to a low loss state to initiate a primary optical pulse at a fundamental optical frequency, thereby initiating a depletion of the optical gain accumulated within the gain medium;

e) converting, by means of the first nonlinear coupler, the primary optical pulse at the fundamental optical frequency to a secondary pulse at a second harmonic frequency;

f) converting, by means of the plurality of secondary nonlinear couplers, one or more of the primary optical pulse and the secondary pulse to an output pulse at a higher harmonic frequency;

g) switching the Q-switch to the high loss state after a peak intensity of the primary optical pulse, thereby ending the primary optical pulse and stopping the depletion of the optical gain such that the secondary pulse width is clipped to less than about 80% at full-width half-maximum (FWHM) of a characteristic minimum pulse width, defined as the pulse width produced in a Q-switched laser having the same parameters but in the limit of the nonlinear coupling level approaching zero;

h) coupling the output pulse at the higher harmonic frequency out of the cavity; and i) repeating steps c) to h).

17. The method of claim 16, wherein the higher harmonic frequency comprises a third harmonic of the fundamental optical frequency.

18. The method of claim 16, wherein the higher harmonic frequency comprises a fourth harmonic of the fundamental optical frequency.

19. The Q-switched laser as defined in claim 1 further comprising a second nonlinear coupler within the resonant cavity for generating a second converted optical power at a third harmonic of the fundamental optical frequency from a portion of the primary optical circulating power at and from a portion of the first converted optical power.

20. The Q-switched laser as defined in claim 1, further comprising a second nonlinear coupler within the resonant cavity for interacting with the first converted optical power to double the second harmonic of the fundamental optical frequency to generate a fourth harmonic of the fundamental optical frequency.

21. The Q-switched laser as defined in claim 1, further comprising second and third nonlinear couplers within the resonant cavity for interacting with the primary optical circulating power and the first converted optical power to generate a fourth harmonic of the fundamental optical frequency, wherein a third harmonic is generated in the second nonlinear coupler from the fundamental optical frequency and the second harmonic of the fundamental optical frequency, and wherein the fourth harmonic is generated in the third nonlinear coupler by summing the third harmonic and the fundamental optical frequency.

* * * * *